(12) United States Patent
Kozlowski et al.

(10) Patent No.: US 11,720,700 B2
(45) Date of Patent: Aug. 8, 2023

(54) SYSTEMS AND METHODS FOR SECURELY DEPLOYING A COLLECTIVE WORKSPACE ACROSS MULTIPLE LOCAL MANAGEMENT AGENTS

(71) Applicant: Dell Products, L.P., Round Rock, TX (US)

(72) Inventors: Joseph Kozlowski, Hutto, TX (US); Ricardo L. Martinez, Leander, TX (US); David Konetski, Austin, TX (US); Carlton A. Andrews, Austin, TX (US); Nicholas D. Grobelny, Austin, TX (US); Charles D. Robison, Buford, GA (US); Girish S. Dhoble, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 133 days.

(21) Appl. No.: 17/126,073

(22) Filed: Dec. 18, 2020

(65) Prior Publication Data

US 2022/0198043 A1 Jun. 23, 2022

(51) Int. Cl.
| | |
|---|---|
| *H04L 29/06* | (2006.01) |
| *G06F 21/62* | (2013.01) |
| *G06F 9/50* | (2006.01) |
| *G06F 21/57* | (2013.01) |
| *G06F 21/44* | (2013.01) |

(52) U.S. Cl.
CPC ........ *G06F 21/6218* (2013.01); *G06F 9/5072* (2013.01); *G06F 21/44* (2013.01); *G06F 21/577* (2013.01); *G06F 2221/2141* (2013.01)

(58) Field of Classification Search
CPC ................. G06F 21/6218; G06F 21/44; G06F 2221/2141
See application file for complete search history.

(56) References Cited

U.S. PATENT DOCUMENTS

| | | | |
|---|---|---|---|
| 8,245,141 B1* | 8/2012 | Fuller | H04L 63/104 715/741 |
| 2003/0065722 A1* | 4/2003 | Leperen | H04L 63/10 709/205 |
| 2006/0069656 A1* | 3/2006 | Horikiri | H04N 7/15 348/E7.083 |
| 2012/0117157 A1* | 5/2012 | Ristock | G06Q 30/06 709/205 |
| 2020/0117826 A1* | 4/2020 | Lilly, Jr. | G06F 21/6254 |

\* cited by examiner

*Primary Examiner* — Jason K Gee
(74) *Attorney, Agent, or Firm* — Fogarty LLP

(57) ABSTRACT

Systems and methods for securely deploying a collective workspace across multiple local management agents are described. In some embodiments, an Information Handling System (IHS) may include a processor and a memory coupled to the processor, the memory having program instructions stored thereon that, upon execution, cause the IHS to: receive, at a workspace orchestration service from a first local management agent, first context information and a first split key; receive, at the workspace orchestration service from a second local management agent, second context information and a second split key; determining, by the workspace orchestration service, that the first and second context information match a collaborative workspace policy; in response to the determination, authenticate the first and second split keys; and in response to the authentication, transmit a collaborative workspace definition to the first and second local management agents.

9 Claims, 5 Drawing Sheets

SYSTEMS AND METHODS FOR SECURELY DEPLOYING A COLLECTIVE WORKSPACE ACROSS MULTIPLE LOCAL MANAGEMENT AGENTS

FIELD

This disclosure relates generally to Information Handling Systems (IHSs), and, more specifically, to systems and methods for securely deploying a collective workspace across multiple local management agents.

BACKGROUND

As the value and use of information continue to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or a for specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs provide users with capabilities for accessing, creating, and manipulating data, and often implement a variety of security protocols in order to protect this data. Historically, IHSs have been designed to implement security paradigms that isolate them from possible security threats, much like a castle is designed and constructed to safeguard persons within its walls. In the case of a network of IHSs, for example, security systems implement strategies that isolate the entire network from threats. In effect, a set of castle walls is constructed around the entire network. While working from within the walls of such systems, users may be provided with secure and productive use of data.

However, security paradigms that isolate protected data within the walls of a castle are increasingly frustrated by the realities of modern computing. Nowadays, users expect to access protected data using a plethora of different IHSs while located at a variety of physical locations. In an effort to leverage the security of the system providing access to the data, current protocols for supporting remote access have sought to extend the defenses of the system to remote IHSs, essentially extending the castle walls to temporarily include all or part of the remote IHSs.

Another complication of modern computing is the user's expectation that they will be able utilize their own personal IHSs to access some or all of their protected data, even if those users are provided with enterprise-issued IHSs for accessing it. For administrators of such systems, this increases the difficulty in securing all manners in which protected data may be accessed. This difficulty is greatly expanded by the need to support access to protected data using an ever-growing list of software applications, whether on a personal IHS or an enterprise-issued IHS. Moreover, the administration of such systems is further complicated by the need to support access to protected data from a variety of physical locations and via a variety of networks, including untrusted networks. Faced with such problems, systems for providing access to protected data are often burdensome to administer and ultimately the data is insufficiently protected so as to facilitate its productive use.

A known technique for securing access to protected data accessed via an IHS is to isolate the data within a segregated or virtualization environment that runs on the IHS using a virtual machine or container. Conventional types of virtualization environments provide varying degrees of isolation from the hardware and the operating system (OS) of the IHS. However, similarly to the castle wall defenses of security paradigms that seek to isolate protected data within a secure perimeter, conventional virtualization environments are also ill-suited to modern computing. Particularly, these virtualization techniques establish an isolated computing environment on an IHS that allows a user to access only data and applications approved for that user.

In some instances, conventional virtualization techniques may determine the data, applications, and protections to be provided by on an IHS based solely on the identity of the user, and therefore tend to implement all security protocols that would be necessary to secure access to all approved data and applications. As the inventors hereof have recognized, however, not only does this result in complex virtualization efforts that consume large portions of the memory and processing capabilities of the IHS, but conventional techniques also do not account for what the user actually intends to do while operating the IHS.

As the inventors hereof have further recognized, modern computing ought to provide users with access to protected data via a variety of IHSs and at practically any location. Yet conventional virtualization fails to account for the specific context in which an IHS is being used during a particular session, much less to account for changes to the context in which an IHS is used during a session. Furthermore, conventional virtualization techniques tend to provide support for many capabilities that are not actually used. The overhead required to provide such unnecessary capabilities unduly burdens the operation of an IHS and degrades productivity and user experience.

SUMMARY

Systems and methods for securely deploying a collective workspace across multiple local management agents are described. In an illustrative, non-limiting embodiment, an Information Handling System (IHS) may include a processor and a memory coupled to the processor, the memory having program instructions stored thereon that, upon execution, cause the IHS to: receive, at a workspace orchestration service from a first local management agent, first context information and a first split key; receive, at the workspace orchestration service from a second local management agent, second context information and a second split key; determining, by the workspace orchestration service, that the first and second context information match a collaborative workspace policy; in response to the determination, authenticate the first and second split keys; and in response to the authentication, transmit a collaborative workspace definition to the first and second local management agents.

The first context information may include at least one of: an identification of a locale of the first local management agent, an identification of a user of the first local management agent, an identification of a network of the first local management agent, an identification of hardware of the first local management agent, an identification of a requested datafile, or an identification of a storage system of the requested datafile; and the second context information may include at least one of: an identification of a locale of the second local management agent, an identification of a user of the second local management agent, an identification of a network of the second local management agent, an identification of hardware of the second local management agent, the identification of the requested datafile, or the identification of the storage system of the requested datafile.

To transmit the collaborative workspace definition to the first and second local management agents, the program instructions, upon execution, may cause the IHS to: transmit a first portion of the collaborative workspace definition to the first local management agent; and transmit a second portion of the collaborative workspace definition to the second local management agent.

Each of the first and second local management agents may be configured to instantiate at least one aspect of a collaborative workspace based upon the collaborative workspace definition. The collaborative workspace definition may include at least one of: a threat monitoring level, a threat detection level, a threat analytics level, a threat response level, a storage confidentiality level, a network confidentiality level, a memory confidentiality level, a display confidentiality level, a user authentication level, an Information Technology (IT) administration level, a regulatory compliance level, a local storage control level, a Central Processing Unit (CPU) access level, a graphics access level, an application usage level, or an application installation level.

The program instructions, upon execution, may cause the IHS to, in response to the authentication, grant or remove access to protected data matching the collaborative workspace policy. The program instructions, upon execution, may also cause the IHS to grant or remove to the protected data in response to an indication that the first and second local management agents meet a quorum or plenary session indicated in the collaborative workspace policy. The program instructions, upon execution, may further cause the IHS to, in response to the authentication, deny access to, or redact, a portion of the protected data matching the collaborative workspace policy.

In some cases, the program instructions, upon execution, may cause the IHS to: receive, at the workspace orchestration service from a third local management agent, third context information and a third split key; determine, by the workspace orchestration service, that the third context information matches the collaborative workspace policy; in response to the determination, authenticate the third split key; in response to the authentication, transmit the collaborative workspace definition to the third local management agent; and grant or remove access to the portion of the protected data.

In another illustrative, non-limiting embodiment, a memory storage device may have program instructions stored thereon that, upon execution by an IHS, cause the IHS to: receive, at a workspace orchestration service from a first local management agent, first context information and a first split key; determine, by the workspace orchestration service, that the first context information matches a collaborative workspace policy; and wait for a second local management agent identified in the collaborative workspace policy to transmit a second split key to the workspace orchestration service before transmitting a collaborative workspace definition to the first local management agent.

In yet another illustrative, non-limiting embodiment, a method may include: transmitting, from a first local management agent to a workspace orchestration service, context information and a first split key, where the workspace orchestration service is configured to: (i) receive, from a second local management agent, a second split key; (ii) authenticate the first and second split keys; and (iii) in response to the authentication, retrieve or create a collaborative workspace definition based upon a collaborative workspace policy matching the context information; receiving, at the first local management agent from the workspace orchestration service, the collaborative workspace definition; and instantiating at least a portion of a collaborative workspace based upon the collaborative workspace definition.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
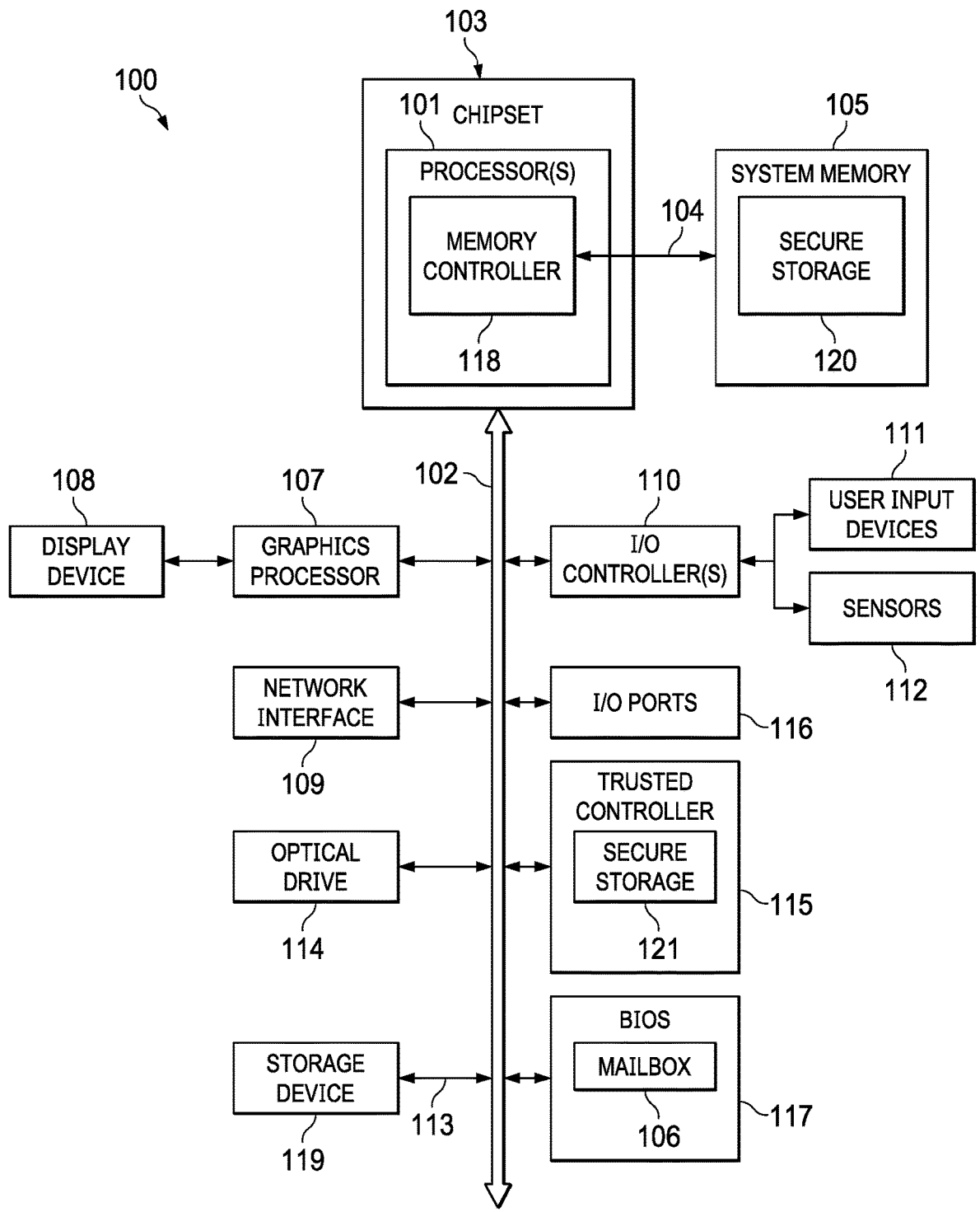
FIG. 1 is a diagram depicting examples of components of an IHS configured to modernize workspace and hardware lifecycle management in an enterprise productivity ecosystem according to various embodiments.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, other embodiments may utilize various other types of IHSs.

FIG. 1 is a diagram depicting components of an example IHS 100 configured for securing a dynamic workspace in an enterprise productivity ecosystem. In some embodiments, IHS 100 may be employed to instantiate, manage, and/or terminate a workspace, such as a secure environment that may provide the user of IHS 100 with access to enterprise data while isolating the enterprise data from the operating system (OS) and other applications executed by IHS 100. In some embodiments, the construction of a workspace for a particular purpose and for use in a particular context may be orchestrated remotely from the IHS 100 by a workspace orchestration services, such as described with regard to FIG. 1. In some embodiments, portions of the workspace orchestration may be performed locally on IHS 100. IHS 100 may be configured with program instructions that, upon execution, cause IHS 100 to perform one or more of the various operations disclosed herein. In some embodiments, IHS 100 may be an element of a larger enterprise system that may include any number of similarly configured IHSs in network communications with each other.

As shown in FIG. 1, IHS 100 includes one or more processor(s) 101, such as a Central Processing Unit (CPU), operable to execute code retrieved from system memory 105. Although IHS 100 is illustrated with a single processor, other embodiments may include two or more processors, that may each be configured identically, or to provide specialized processing functions. Processor(s) 101 may include any processor capable of executing program instructions, such as an INTEL PENTIUM series processor or any general-purpose or embedded processors implementing any of a variety of Instruction Set Architectures (ISAs), such as the x86, POWERPC®, ARM®, SPARC®, or MIPS® ISAs, or any other suitable ISA. In the embodiment of FIG. 1, processor(s) 101 includes an integrated memory controller 118 that may be implemented directly within the circuitry of the processor(s) 101, or memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 that is coupled to processor(s) 101 via memory bus 104 provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory.

In certain embodiments, system memory 105 includes secure storage 120 that may be a portion of the system memory designated for storage of information, such as access policies, component signatures, encryption keys, and other cryptographic information, for use in hosting a secure workspace on IHS 100. In such embodiments, a signature may be calculated based on the contents of secure storage 120 and stored as a reference signature. The integrity of the data stored in secure storage 120 may then be validated at a later time by recalculating this signature of the contents of the secure storage and comparing the recalculated signature against the reference signature.

IHS 100 utilizes chipset 103 that may include one or more integrated circuits that are coupled to processor(s) 101. In the embodiment of FIG. 1, processor(s) 101 is depicted as a component of chipset 103. In other embodiments, all of chipset 103, or portions of chipset 108 may be implemented directly within the integrated circuitry of processor(s) 101. Chipset 103 provides processor(s) 101 with access to a variety of resources accessible via bus 102. In IHS 100, bus 102 is illustrated as a single element. However, other implementations may utilize any number of buses to provide the illustrated pathways served by bus 102.

As illustrated, a variety of resources may be coupled to processor(s) 101 of IHS 100 through chipset 103. For instance, chipset 103 may be coupled to network interface 109, such as provided by a Network Interface Controller (NIC) that is coupled to the IHS 100 and allows the IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. In certain embodiments, network interface 109 may support connections between a trusted IHS component, such as trusted controller 115, and a remote orchestration service. In such embodiments, a connection supported by network interface 109 between the remote orchestration service and the trusted component may be considered an out-of-band (OOB) connection that is isolated from the OS of the IHS.

Chipset 102 may also provide access to one or more display device(s) 108 via graphics processor 107. In certain embodiments, graphics processor 107 may be comprised within one or more video or graphics cards or an embedded controller installed as components of the IHS 100. Graphics processor 107 may generate display information and provide the generated information to one or more display device(s) 108 coupled to IHS 100, where display device(s) 108 may include integrated display devices and/or external display devices coupled to IHS, such as via an I/O port 116, where display device(s) 108 may include integrated display devices and/or external display devices coupled to IHS. In certain embodiments, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102.

In certain embodiments, chipset 103 may utilize one or more I/O controllers to access hardware components such as user input devices 111 and sensors 112. For instance, I/O controller 110 may provide access to user-input devices 110 such as a keyboard, mouse, touchpad, touchscreen and/or other peripheral input devices. User input devices 111 may interface with I/O controller 110 through wired or wireless connections. Sensors 112 accessed via I/O controllers 110 may provide access to data describing environmental and operating conditions of IHS 100 (e.g., accelerometers, gyroscopes, hinge sensors, rotation sensors, hall effect sensors, temperature sensors, voltage sensors, current sensors, IR sensors, photosensors, proximity sensors, distance sensors, magnetic sensors, microphones, ultrasonic sensors, etc.).

In some cases, chipset 103 may include a sensor hub capable of utilizing information collected by sensors 112 in determining the relative orientation and movement of IHS 100. For instance, the sensor hub may utilize inertial movement sensors, that may include accelerometer, gyroscope, and magnetometer sensors, and are capable of determining the current orientation and movement of IHS 100 (e.g., IHS 100 is motionless on a relatively flat surface, IHS 100 is being moved irregularly and is likely in transport, the hinge of IHS 100 is oriented in a vertical direction). In certain embodiments, the sensor hub may also include capabilities for determining a location and movement of IHS 100 based on triangulation of network signal and based on network information provided by the OS or network interface 109. In some embodiments, the sensor hub may support additional sensors, such as optical, infrared and sonar sensors, that may provide support for xR (virtual, augmented, and/or mixed reality) sessions hosted by the IHS 100 and may be used by the sensor hub provide an indication of a user's presence near IHS 100, such as whether a user is present, absent, and/or facing the integrated display 108.

In cases where the end-user is present before IHS 100, the sensor hub may further determine a distance of the end-user from the IHS, where this determination may be made continuously, at periodic intervals, or upon request. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B). As described in additional detail below, the failure to detect an authenticated user of the IHS 100 within a proximity of the IHS 100 may result in a change in the security profile of IHS 100, thus triggering a re-evaluation of the security risk of workspaces operating on IHS 100. Similar re-evaluation may be triggered based on the detection of additional individuals in proximity to IHS 100.

In embodiments where IHS 100 may support multiple physical configurations, such as a convertible laptop, N-in-1 device, or the like, the sensor hub may utilize one or more mode sensors 112 that collect readings that may be used in determining the current posture in which the IHS 100 is physically configured. In certain embodiments, such posture determinations may be additionally made using the movement and orientation information provided by sensors 112. In laptop and convertible laptop embodiments, for example, processor 101 or trusted controller 115 may utilize a lid position sensor 112 to determine the relative angle between the two panels of the laptop in order to determine the mode in which IHS 100 is physically configured. In such embodiments, the lid position sensor may measure the angle of rotation of the hinge that connects the base panel and lid panel of IHS 100. In some embodiments, processor 101 or trusted controller 115 may provide collected lid position information, such as the hinge angle, to the sensor hub for use in determining the posture in which IHS 100 is configured. In some embodiments, the sensor hub may interface directly with the lid position sensor in determining hinge angle information.

The sensor hub may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture. The sensor hub may additionally utilize orientation and movement information collected from inertial movement sensors 112 to further determine the posture in which the IHS 100 is physically configured. For instance, if the sensor hub determines that IHS 100 is configured with a hinge angle of a laptop configuration, but IHS 100 is oriented on its side, the IHS may be determined to be in a book mode. If IHS 100 is determined to be tilted such that the hinge is oriented between horizontal and vertical, the user's face is detected to be facing the integrated display, and IHS 100 is experiencing slight movement, the sensor hub may determine that the IHS 100 is being used in a book posture. The sensor hub may determine that IHS 100 is opened to a 180-degree hinge angle and lies on a flat surface, thus indicating that IHS 100 it is being used in a landscape posture. The sensor hub may similarly determine that IHS 100 is in a tent configuration, in response to detecting a hinge angle within a defined range, such as between 300 and 345 degrees, and also detecting an orientation of IHS 100 where the hinge is aligned horizontally and is higher than both of the display panels of IHS 100.

Other components of IHS 100 may include one or more I/O ports 116 for communicating with peripheral external devices as well as various input and output devices. For instance, I/O 116 ports may include HDMI (High-Definition Multimedia Interface) ports for use in connecting external display devices to IHS 100 and USB (Universal Serial Bus) ports, by which a variety of external devices may be coupled to IHS 100. In some embodiments, external devices coupled to IHS 100 via an I/O port 116 may include storage devices that support transfer of data to and from system memory 105 and/or storage devices 119 of IHS 100. As described in additional detail below, the coupling of storage devices via an I/O port 116 may result in a change in the security profile of IHS 100, thus triggering a re-evaluation of the security risk of workspaces operating on IHS 100.

Chipset 103 also provides processor(s) 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In some embodiments, storage device 119 may be a system of storage devices, such as a cloud drive accessible via network interface 109.

As illustrated, IHS 100 also includes BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to IHS 100. BIOS 117 instructions may also load an OS for use by IHS 100. BIOS 117 provides an abstraction layer that allows the OS to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In the illustrated embodiment, BIOS 117 includes a predefined memory or memory region that may be referred to as NVM (Non-Volatile Memory) mailbox 106. In such an implementation, mailbox 106 may provide a secured storage location for use in storing workspace access policies, signatures, cryptographic keys or other data utilized to host and validate a workspace on IHS 100. In certain embodiments, the BIOS mailbox 106 may be utilized as a secure storage utilized by a remote orchestration service in order to store access policies and cryptographic keys for use in delivering and deploying a secured container on IHS 100. BIOS mailbox 106 and secured storage 120 in system memory 105 may be utilized in this manner instead of, or in conjunction with, out-of-band functions implemented by trusted controller 115.

In certain embodiments, trusted controller 115 is coupled to IHS 100. For example, trusted controller 115 may be an embedded controller (EC) that is installed as a component of the motherboard of IHS 100. In various embodiments, trusted controller 115 may perform various operations in support of the delivery and deployment of a workspace to IHS 100. In certain embodiments, trusted controller 115 may interoperate with a remote orchestration service via an out-of-band communications pathway that is isolated from the OS that runs on IHS 100. Network interface 109 may support such out-of-band communications between trusted controller 115 and a remote orchestration service.

Trusted controller 115 may receive cryptographic information required for secure delivery and deployment of a workspace to IHS 100. In such embodiments, the cryptographic information may be stored to secured storage 121 maintained by trusted controller 115. Additionally, or alternatively, trusted controller 115 may support execution of a trusted operating environment that may support cryptographic operations used to deploy a workspace on IHS 100. Additionally, or alternatively, trusted controller 115 may support deployment of a workspace within the OS of IHS 100 via an out-of-band communications channel that is isolated from the OS and allows the workspace to communicate with a trusted agent process of the OS.

Trusted controller 115 may also provide support for certain cryptographic processing used to support secure deployment and operation of workspaces on IHS 100. In some embodiments, such cryptographic processing may be provided via operations of a secure operating environment hosted by trusted controller 115 in isolation from the software and other hardware components of the IHS 100. In some embodiments, trusted controller 115 may rely on cryptographic processing provided by dedicated cryptographic hardware supported by the IHS, such as a TPM (Trusted Platform Module) microcontroller. In some embodiments, the secured storage 121 of trusted controller 115 may be utilized to store cryptographic information for use in authorization of workspaces.

In certain embodiments, trusted controller 115 may be additionally configured to calculate signatures that uniquely identify individual components of IHS 100. In such scenarios, trusted controller 115 may calculate a hash value based on the configuration of a hardware and/or software component coupled to IHS 100. For instance, trusted controller 115 may calculate a hash value based on all firmware and other code or settings stored in an onboard memory of a hardware component, such as a network interface 109. Such hash values may be calculated as part of a trusted process of manufacturing IHS 100 and may be maintained in the secure storage 121 as a reference signature.

Trusted controller 115 may be further configured to recalculate a hash value at a later time for such a component. The hash value recalculated for the component may then be compared against the reference hash value signature in order to determine if any modifications have been made to a component, thus indicating the component has been compromised. In this manner, trusted controller 115 may be used to validate the integrity of hardware and software components installed on IHS 100. In certain embodiments, remote orchestration service 206 may verify the integrity of the trusted controller 115 in the same manner, by calculating a signature of trusted controller 115 and comparing it to a reference signature calculated during a trusted process for manufacture of IHS 100. In various embodiments, one or more of these operations supported by trusted controller 115 may be implemented using BIOS 117.

Trusted controller 115 may also implement operations for interfacing with a power adapter in managing power for IHS 100. Such operations may be utilized to determine the power status of IHS 100, such as whether IHS 100 is operating from battery power or is plugged into an AC power source. Firmware instructions utilized by trusted controller 115 may be used to operate a secure execution environment that may include operations for providing various core functions of IHS 100, such as power management and management of certain operating modes of IHS 100 (e.g., turbo modes, maximum operating clock frequencies of certain components, etc.).

In managing operating modes of IHS 100, trusted controller 115 may implement operations for detecting certain changes to the physical configuration of IHS 100 and managing the modes corresponding to different physical configurations of IHS 100. For instance, where IHS 100 is a laptop computer or a convertible laptop computer, trusted controller 115 may receive inputs from a lid position sensor 112 that may detect whether the two sides of the laptop have been latched together to a closed position. In response to lid position sensor 112 detecting latching of the lid of IHS 100, trusted controller 115 may initiate operations for shutting down IHS 100 or placing IHS 100 in a low-power mode.

IHS 100 may support the use of various power modes. In some embodiments, the power modes of IHS 100 may be implemented through operations of trusted controller 115 and/or the OS of IHS 100. In various embodiments, IHS 100 may support various reduced power modes in order to reduce power consumption and/or conserve battery power when IHS 100 is not actively in use, and/or to control a level of performance available to the user by increasing or decreasing a maximum operating clock frequency of a component of IHS 100 (e.g., processor(s) 101).

In some embodiments, an IHS 100 may not include all of the components shown in FIG. 1. In other embodiments, an IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as systems-on-a-chip.

Figure 2:
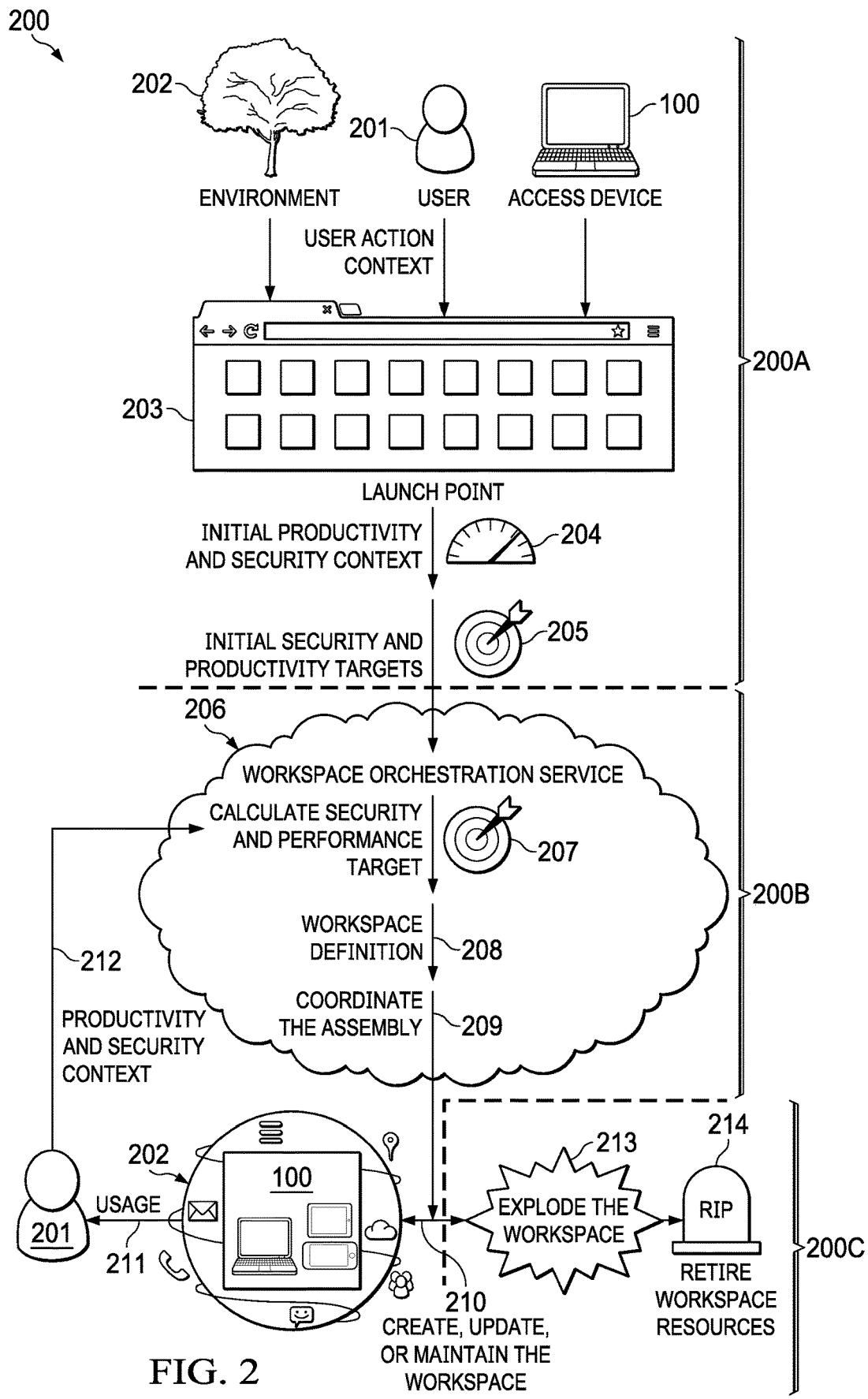
FIG. 2 is a diagram depicting an example of a method for modernizing workspace and hardware lifecycle management in an enterprise productivity ecosystem, according to various embodiments.

FIG. 2 is a diagram depicting an example of method 200 for securing a dynamic workspace in an enterprise productivity ecosystem. For sake of illustration, method 200 has been split into three phases: workspace initialization phase 200A, workspace orchestration phase 200B, and workspace termination phase 200C. During initialization 200A, user 201 (e.g., an enterprise user) operates an IHS 100 (e.g., a desktop, a laptop, a tablet, a smart phone, etc.) such as described with regard to FIG. 1 within physical environment 202 (e.g., any type of environment and its associated context, including physical location, geographic location, location within a particular facility or building, detected networks, time of day, proximity of the user, individuals in the vicinity of IHS 100, etc.).

Method 200 starts with an action by user 201 at a launch point 203 that may be, for example, a corporate launch point provided by an employer of user 201, a launch point 203 provided by the manufacturer of IHS 100, or a launch point provided as a service to user 201 by a third-party. Particularly, user 201 operates IHS 100 to access launch point 203 that is provided, for example, in the form of a web portal, a portal application running in the OS of IHS 100, a special-purpose portal workspace operating on IHS 100, or the like. In various implementations, launch point 203 may include Graphical User Interface (GUI) elements representing different software applications, data sources and/or other resources that the user may desire to execute and/or manipulate. In various embodiments, launch point may provide a graphical, textual and/or audio interface by which data or other resource may be requested by a user 201. As such, an authenticated user 201 may be provided a launch point that provides visibility as to one or more software applications and an aggregation of user's data sources available across all of their datastores (e.g., local storage, cloud storage, etc.).

As described in additional detail below, workspaces for providing user 201 with access to requested data or other resources may operate using a local management agent 332 that operates on IHS 100 and is configured to interoperate with workspace orchestration service 206. In various embodiments, launch point 203 may be provided in the form of a portal (e.g., a webpage, OS application or special purpose workspace) that allows user 201 to request access to managed resources. In various embodiments, launch point 203 may be hosted by remote workspace orchestration service 206, local management agent 332 on IHS 100, or any suitable combination thereof. Examples of launch point 203 technologies may include WORKSPACE ONE INTELLIGENT HUB from WMWARE, INC., and DELL HYBRID CLIENT from DELL TECHNOLOGIES INC., among others.

Initialization phase 200A begins when user 201 chooses to launch an application or access a data source managed by the workspace orchestration service 206. In response to an access request issued by user 201 (e.g., the user "clicks" on an icon of launch point 203), local management agent 332 of IHS 100 collects initial security and productivity context information at 204. For example, security context information may include attributes indicating a security risk associated with: the data and/or application being requested, a level of risk presented by the user 201, the hardware utilized by the IHS 100, the logical environment of IHS 100 in which a workspace will be deployed to provide access to the requested data and/or application, and the physical environment 202 in which IHS 100 is currently located.

Accordingly, in this disclosure, the term "security context" generally refers to data or other information related to a security posture in which a workspace will be deployed and utilized, where the security posture may be based on the, user, IHS 100, data to be accessed via the workspace, and/or environment 202. As described in additional detail with regard to FIGS. 4 and 5, a security context may be quantified as a security risk score in support of evaluations of the level or risk associated with providing user 201 access to requested data and/or application while using IHS 100 in the particular context. A "security risk score" generally refers to a numerical value usable to score, quantify, or measure various security characteristics of the security context associated with a request. A risk score may be an aggregate score associated with the overall security risk context, whereas a "risk metric" may be a measurement of risk for a subcategory of some part of the security context.

For example, security metrics that may be used in the calculation of a security risk score for a particular security context may include, but are not limited to: a classification of the requested data source and/or application, authentication factors used to identify user 201, the location of IHS 100, a role or other group classifications associated with user 201, validation of networks in use by IHS 100, type of network in use by IHS 100, network firewall configurations in use by IHS 100, indicators of attack (IoA), indicators of compromise (IoC) regarding IHS 100 or a resource being requested by user 201, patch levels associated with the OS and other applications in use on IHS 100, availability of encryption, type of available encryption, access to secured storage, use of attestable hardware by IHS 100, supported degree of workspace isolation by IHS 100, etc.

The term "productivity context" generally refers to user productivity associated with a workspace, user, IHS, or environment. A "productivity score" generally refers to an index usable to score, quantify, or measure various productivity characteristics of a productivity context. Examples of productivity context information include, but are not limited to: the hardware of the IHS, the software of the IHS, including the OS, power states and maximum clock frequencies of selected components of the IHS, peripheral devices coupled to the IHS, either permanently or temporarily, networks available to the IHS and the performance characteristics of those networks, software installers available on the IHS, etc.

Initial productivity and security targets for a workspace may be calculated based on the context of user's 201 actions combined with the productivity and security context in which the workspace will operate. The productivity and security targets may also be based on user's 201 behavioral analytics, IHS 100 telemetry and/or environmental information (e.g., collected via sensors 112). In some cases, at 205, a local management agent operating on IHS 100 may calculate initial security and productivity targets based upon the collected security and productivity context. In other cases, remote workspace orchestration service 206 may calculate security and productivity targets.

As used herein, the term "security target" generally refers to the attack surface presented by a workspace that is created and operated based on a workspace definition, while the term "productivity target" generally refers to the productivity characteristics of a particular workspace definition. Examples of a productivity target include, but are not limited to: type of data or data source available to user 201, minimum latency of a workspace, etc. Conversely, attributes that may be used to characterize a security target may include, but are not limited to: a minimum security score for a workspace, a minimum trust score of IHS 100, authentication requirements for user 201 (e.g., how many authentication factors are required, frequency of re-authentication), minimum level of trust in the network utilized by a workspace, required isolation of a workspace from IHS 100, the ability to access browser within a workspace, the ability to transfer data between workspaces, the ability to extend a workspace, etc.

Moreover, the term "workspace definition" generally refers to a collection of attributes that describe aspects a workspace that may be assembled, created, and deployed in a manner that satisfies a security target (i.e., the definition presents an attack surface that presents an acceptable level of risk) and a productivity target (e.g., data access, access requirements, upper limits on latency, etc.) in light of the security context (e.g., location, patch level, threat information, network connectivity, etc.) and the productivity context (e.g., available device type and performance, network speed, etc.) in which the workspace is to be deployed. A workspace definition may enable fluidity of migration of an instantiated workspace, since the definition supports the ability for a workspace to be assembled on any target OS or IHS that is configured for operation with the workspace orchestration service 206.

In describing capabilities and constraints of a workspace, a workspace definition 208 may prescribe one or more of: authentication requirements for user 201, containment and/or isolation of the workspace (e.g., local application, sandbox, docker container, progressive web application or "PWA," Virtual Desktop Infrastructure "VDI," etc.), primary applications that can be executed in the defined containment of the workspace to enable user 201 to be productive with one or more data sources, additional applications that enhance productivity, security components that reduce the scope of the security target presented by the productivity environment (DELL DATA GUARDIAN from DELL TECHNOLOGIES INC., an anti-virus, etc.), the data sources to be accessed and requirements for routing that data to and from the workspace containment (e.g., use of VPN, minimum encryption strength), workspace capabilities to independently attach other resources; etc.

In some implementations, workspace definitions may be based at least in part on static policies or rules defined, for example, by an enterprise's Information Technology (IT) personnel. In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then workspace orchestration service 206 may autonomously add that application to the default workspace definition for that user.

Still with respect to FIG. 2, during orchestration 200B, the initial security and productivity targets are processed and/or reconciled against resources, device capabilities, and cloud services available, etc., to produce a workspace definition at 208. As described, a workspace definition may specify capabilities and constraints of a workspace, such as: runtime security requirements of the workspace containment (e.g., such as isolation from the OS of IHS 100 or from certain hardware of IHS 100), the use of reference measurements to attest to the integrity of the workspace once running, applications to be provided for operation within the workspace, aggregation of resources available via the workspace, access configurations (e.g., virtual private network or "VPN"), etc.

The initial workspace definition may then be utilized by automation engine 302 of workspace orchestration service 206 to coordinate the assembly 209 and instantiation 210 of a workspace on an appropriate platform—e.g., on the cloud or on IHS 201—based on the security and productivity contexts in which the workspace will operate. In cases where a workspace is cloud-hosted, the automation engine 302 may assemble and instantiate a remote workspace that may be accessed via a secure connection established via a web browser or other web-based component operating on the IHS 100. In some embodiments, automation engine 302 may resolve configuration conflicts between a workspace definition and the user's inputs in the operation of a workspace.

The instantiated workspace is operated by user 201 at 211, and new productivity and security context information related to the behavior or use of data is generated at 212. This operation of a workspace may result in a change or new classification of data based upon what user 201 has done, accessed, and/or created, thus resulting in a change to the security context of the workspace. To the extent the user's behavioral analytics, device telemetry, and/or the environment has changed to a quantifiable degree, these changes in security context may serve as additional input for a reevaluation of the security and performance targets at 207 by automation engine 302. Additionally, or alternatively, new workspace context, security target, and/or productivity target may be now measured against the initial targets, and the result may cause automation engine 302 to produce a new workspace definition at 208, if appropriate.

Particularly, if the instantiated workspace(s) have parameters that fall outside of the range of the target indexes such that a difference between additional or updated context information and the initial or previous context information is scored below a threshold value, automation engine 302 may process the assembly of modifications to an existing workspace and deploy such modifications at 210. Conversely, if the difference between the additional or updated context information and the initial or previous context information is scored above a threshold value, automation engine 302 may generate a new workspace at 210. Session data metadata and context may be preserved by data aggregation engine 336, and session data may be restored as applicable.

Additionally, or alternatively, method 200 may terminate or retire the initial or previous workspace at 213, as part of termination phase 200C. In some cases, user action may initiate the termination process (e.g., user 201 closes application or browser accessing data) and/or termination may take place automatically as part of an adjustment in workspace definition (e.g., the isolated environment is instructed to terminate by automation engine 302). Still as part of termination phase 200C, workspace resources of IHS 100 and/or at workspace orchestration service 206 may be released.

As such, in various embodiments, method 200 enables secure user productivity even when a workspace operates on an IHS or cloud platform that is not under direct management. Method 200 also provides for dynamic or adaptive configurations and policies allowing for the best possible user experience while maintaining appropriate level of security. In some cases, the definition of a productivity environment and access requirements may be selected based upon productivity and security dependencies and targets, and the definition of capabilities related to the workspace may be adaptive in nature. Particularly, workspace definition attributes may be dynamically selected based upon historical productivity and security information, based upon each individual user or group's behavior.

Figure 3A:
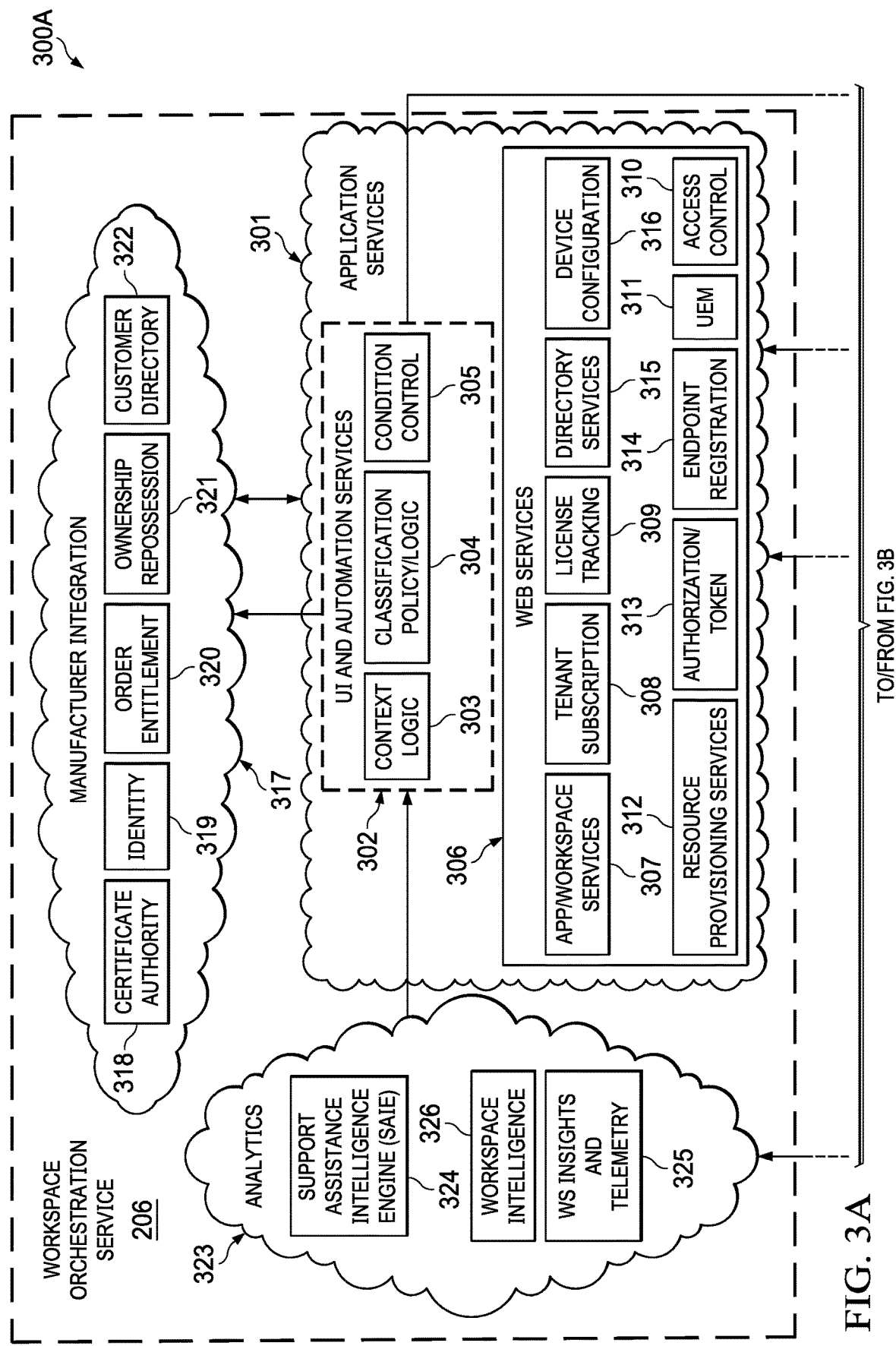
FIGS. 3A and 3B are diagrams depicting an example of a system configured to modernize workspace and hardware lifecycle management in an enterprise productivity ecosystem, according to various embodiments.
Figure 3B:
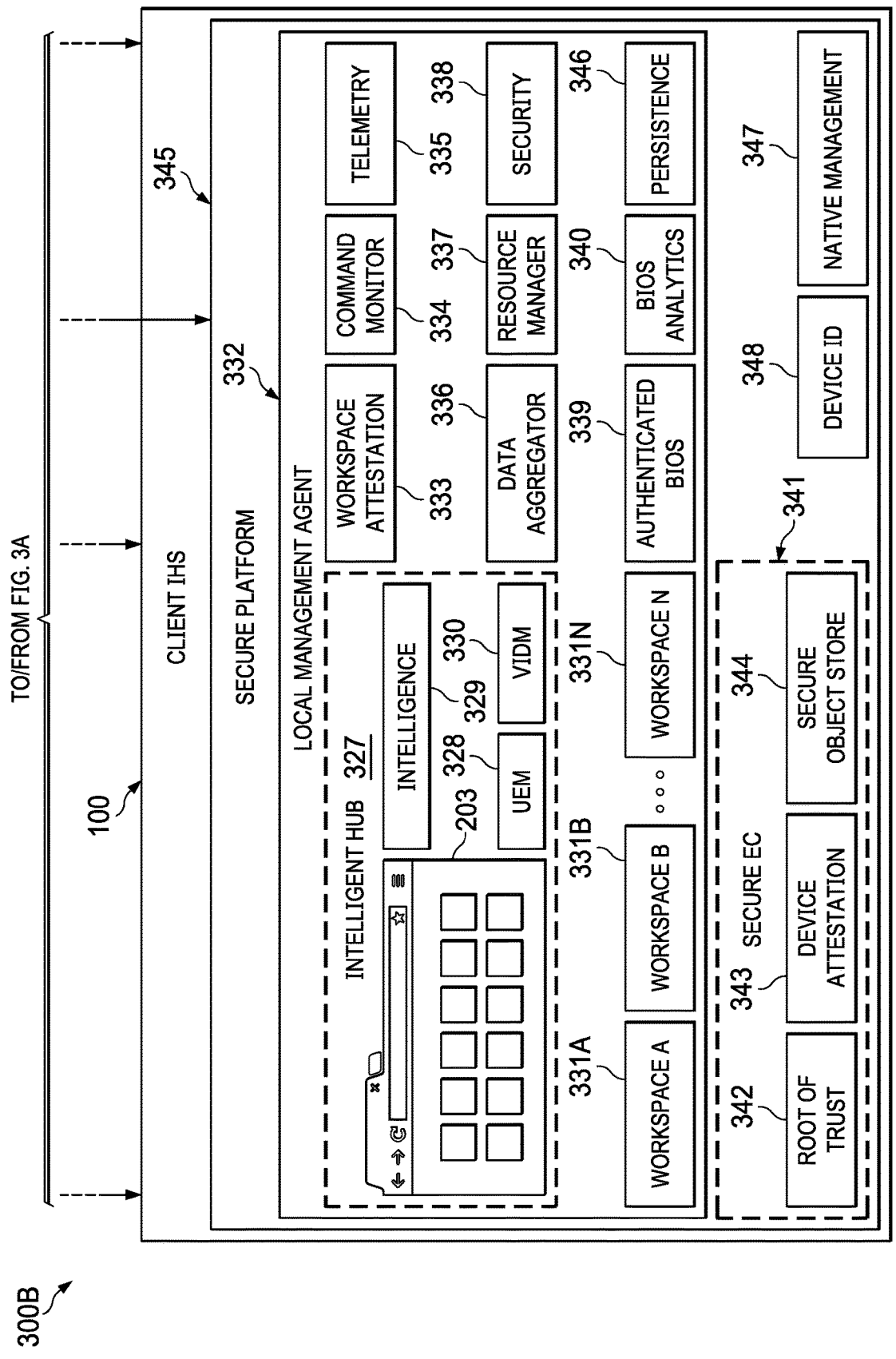

FIGS. 3A and 3B show a diagram of an example of system components 300A and 300B (collectively referred to as "system 300") configured to modernize workspace and hardware lifecycle management in an enterprise productivity ecosystem. Particularly, component system 300A comprises workspace orchestration service 206, and it may include one or more IHSs remotely located and/or networked having program instructions stored thereon that, upon execution, cause the one or more IHSs to perform various workspace orchestration operations described herein, including, but not limited to: the dynamic evaluation of security and productivity targets based upon updated context information received from IHS 100, the calculation of risk scores and other productivity and security metrics based on ongoing collection of context information, the generation of workspace definitions, and the assembly of one or more files or policies that enable the instantiation of a workspace in accordance with a workspace definition at a cloud service and/or IHS 300B.

Component 300B includes IHS 100 may have program instructions stored thereon that, upon execution, cause IHS 100 to perform various local management operations described herein, including, but not limited to, the collection of productivity and security context information, the calculation of productivity scores and/or risk scores, the instantiation, execution, and modification of a workspace based upon files or policies, such as workspace definitions, received from workspace orchestration service 206, etc.

Workspace orchestration service 300A and IHS 300B may be coupled to each other via any suitable network technology and/or protocol, which allows workspace orchestration service 300A to be remotely provided with respect to IHS 300B. As described with regard to FIG. 1, an IHS according to embodiments may include a component such as a trusted controller that may support certain secure out-of-band communications that are independent from the OS of IHS 100. In some embodiments, such a trusted controller may be configured to support deployment and operation of workspaces on 300A and to report changes in context information to the workspace orchestration service 300A.

As illustrated in component 300A of FIG. 3A, workspace orchestration service 206 may include a number of sub-components that support deployment and ongoing evaluation and adaptation of workspaces on an IHS 300B. Embodiments of the workspace orchestration service 300A may include systems that may support: web services 306, manufacturer integration 317, and analytics 323. Moreover, web services 306 may comprise application services 301 and user interface (UI) and automation services 302.

Analytics services 323 may be configured to receive and process context information from IHS 300B, both during initial configuration of a workspace and in ongoing support of workspaces, and to provide that information, along with any analytics generated, to context logic 303 of application services 301. Based on information collected during the deployment and ongoing support of workspaces, support assistance intelligence engine (SATE) 324 may be configured to generate and/or analyze technical support information (e.g., updates, errors, support logs, etc.) for use in diagnosing and repairing workspace issues. Workspace insights and telemetry engine 325 may be configured to analyze and/or produce device-centric, historical, and behavior-based data (e.g., hardware measurements, use of features, settings, etc.) resulting from the operation of workspaces. Workspace intelligence 326 may include any suitable intelligence engine for processing and evaluating context data in order to identify patterns and tendencies in the operation of workspaces and in the adaptation of workspaces based on context changes.

As illustrated, an application services 306 system of the workspace orchestration service 300A includes an UI and automation services 302 system that may include context logic or engine 303, classification policy 304, and condition control module or engine 305. Context logic or engine 303 may support processing of context information in making risk assessments (e.g., evaluating the risk associated requests by the user against the context of the user's behavior, history of the user's IHS, capabilities of the user's IHS, and environmental conditions). For instance, security context information collected by IHS 300B may be provided to workspace orchestration service 300A where it may be used, such as by context logic 303, to calculate a risk score associated with a request for use of a managed data source and/or application. Classification policy 304 may include administrator and machine-learning defined policies describing risk classifications associated with different security contexts, such as risk classifications for specific data, locations, environments, IHSs, logical environments, or user actions (e.g., use of high-risk data requires use of a workspace definition suitable for use with a risk score above a specific value). Condition control module or engine 305 may include intelligence providing automated decision making for appropriately aligning risk and context. In some cases, condition control module or engine 305 may dynamically deploy a solution to address any detected misalignment of risk and context. For instance, upon requesting access to a highly classified data source that results in a significant increase in risk score, the condition control engine may select workspace definition modifications that implement security procedures that are suitable for the higher risk score.

Application services 301 may include a group of web services 306 called on by UI and automation services 302 to support various aspects of the orchestration of workspaces. Particularly, web services 306 may include application and workspace services 307 that may assemble and package applications for deployment in a workspace (e.g., an ".msix" file packaged and deployed to a MICROSOFT HYPER-V container). In some embodiments, a workspace definition may be used to specify whether a user will be provided access to an application in this manner. Web services 306 may also include a tenant subscription module 308, that performs dynamic configuration of an IHS and deployment of the described workspace orchestration services at the point-of-sale (POS) of an IHS. A license tracking module 309 may be used to maintain and track license information for software, services, and IHSs. An access control module 310 may provide top level access controls used in controlling access to data and applications by authorized users. A Unified Endpoint Management (UEM) module 311 may be configured to support the described orchestration of workspaces on various different IHSs that may be utilized by a particular user.

Web services 306 that may be used in support of workspaces may further include resource provisioning services 312 for configuring an IHS or workspace with secrets/credentials necessary to access specific resources (e.g., credentials for use of VPNs, networks, data storage repositories, workspace encryption, workspace attestation, and workspace-to-device anchoring). In some cases, resource provisioning services 312 may include secrets provisioned as part of a trusted assembly process of IHS 300B and, in some instances, associated with a unique identifier 348 of the IHS 300B. Web services 306 may also include an authorization/token module that provides identity functions and may connect to various authentication sources, such as, for example, Active Directory. Endpoint registration module 314 may be configured to register IHSs and/or workspaces with management service that tracks the use of the described workspace orchestration. In some scenarios, a directory services 315 module may be configured to provide active directory services (e.g., AZURE ACTIVE DIRECTORY from MICROSOFT CORPORATION). Device configuration services 316 enable central configuration, monitoring, managing, and optimization of workspaces that in certain contexts may operate remotely from an IHS and may only present the user of the IHS with an image of the workspace output. In cooperation with resource provisioning services 312, device configuration services 316 may also handle secret creation and IHS configuration, and it some cases, may be out-of-band capable and handle selected operations to the endpoint.

Still referring to FIG. 3A, manufacturer integration components 317 communicate with application services 301 and client IHS 300B to provide features that are usable during workspace evaluation and instantiation, where these features are based upon information available to the manufacturer of client IHS 300B. For instance, certificate authority 318 may include an entity that issues digital certificates that may be used in validating the authenticity and integrity of the hardware of IHS 300B. Identity service module or engine 319 may be configured to manage the user's or owner's identity as well as brokering identification for use of customer directory 322. Order entitlement module or engine 320 may be responsible for managing the entitlements purchased as well as the associated issued certificates signed by 318. Ownership repository 321 may manage user entitlements associated with IHSs and their ownership and may provide support for users transferring ownership of an IHS and conveying the entitlements associated with that IHS. In certain scenarios, ownership repository 321 may use this transfer of ownership to decommission the secrets associated with the entitlements embedded in the IHS. Customer directory 322 may be configured to authenticate and authorize all users and IHSs in a network, such as assigning and enforcing security policies for all IHSs and installing or updating software (in some cases, customer directory 322 may work in cooperation and/or may be the same as directory services 315).

Referring now to IHS 300B of FIG. 3B, in some embodiments, IHS 300B may be configured to operate a local management agent 332 that may run within a secure execution environment 345 hosted by a trusted controller 341, such as trusted controller 115 of FIG. 1. In other embodiments, the local management agent 332 may operate as a trusted and attestable process of the OS of IHS 300B. In some embodiments, local management agent 332 may include a workspace engine suitable for instantiating and managing the operation of one or more workspaces 331A-N on IHS 300B. As described, the capabilities of a workspace may be modified based on changes in the productivity and security contexts in which the workspace is operating. Accordingly, the workload(s) in each of the workspaces 331A-N may be hosted in a public cloud, a private cloud, a specific server, or locally hosted on IHS 300B, depending on the context in which the workspace is operating. These allocations of workspace computing for each particular workspace 331A-N may be prescribed by the workspace definition that is used to build and operate each workspace. As described, the workspace definition may be created by workspace orchestration service 206 based upon context information provided by IHS 300B, security targets for each workspace 331A-N, and productivity targets for each workspace 331A-N.

In some embodiments, local management agent 332 may be configured to host, launch, and/or execute a workspace hub 327 that provides a launch point 203 by which user's initiate workspaces through the selection of managed data and resources. In various embodiments, launch point 203 may be an agent, application, special-purpose workspace or web portal the provides an interface by which a user may select from an aggregated collection of data sources, applications, calendars, messages or other managed information or resources that are available to the user of IHS 300B via operation of a workspace as described herein. In various embodiments, the launch point 203 may be provided in the form for textual, graphical and/or audio user interfaces that allow a user of IHS 300B to select available data and/or resources. In some embodiments, workspace hub 327 may utilize a local environment management module 328 in providing the workspace interface that is presented to the user on IHS 300B and doing so in a consistent manner across workspaces 331A-N. Workspace hub 327 may also include a local intelligence logic or engine 329 used to support modeling the use of IHS 300B in order to improve characterization of the actual risk associated with a risk context. User authentication and access control operations may be performed by a local identify module 330 that may interface with trusted controller 341 in providing user authentication.

In some cases, each instantiated workspace 331A-N may be an environment that provides a user with access to requested data or applications, where the environment may be isolated in varying degrees from the hardware and software of IHS 300B based on the security context and productivity context in which each workspace 331A-N is operating. In some instances, the selection of a data source or resource that are available to user via launch point 203 may result in launching a new workspace. For instance, if a user launches a browser through selection of an icon displayed by launch point 203, a new workspace may be created and launched according to a workspace definition that has been selected for providing the user access to a web browser in the security and productivity contexts in which the request has been made. In a scenario where the user double clicks on a confidential presentation file available from a data source that is provided by launch point 203, an additional workspace may be instantiated with a presentation application providing access to the requested presentation file, where this new workspace is created based on a workspace definition that provided appropriate security for access to the confidential presentation). In other instances, a selection of the presentation file by a user may result in the presentation being made available through the existing workspace, in some cases using the existing workspace definition and, in other cases, using a workspace definition that has been modified to support the requested access to the confidential presentation file.

Although workspaces 331A-N supported by IHS 330B may each be isolated to varying degrees from the hardware and/or software of IHS 300B and from each other, a user of IHS 330B may expect to be able to operate the multiple workspaces 331A-N in a manner that allows content to be transferred between the different workspaces 331A-N. For instance, a user may select a portion of the data displayed in workspace 331A and utilize OS or other workspace functions to copy the data for copying to workspace 331B.

In various embodiments, a local management agent 332 may operate in full or in part on a secure platform 345 hosted by trusted controller 341 that operates independent from the OS of IHS 300B. In some embodiments, all or part of local management agent 332 may operate as trusted components of the OS of IHS 300B. To execute the various operations described herein, local management agent 332 may include a command monitor 334 configured to provide instrumentation to receive commands from workspace orchestration service 300A and thus enable access to IHS 300B. Local management agent 332 may also include telemetry module 335 that may be configured for communicating collected information to the workspace orchestration service 300A, including reporting changes in context that may warrant adjustments to workspaces 331A-N. Data aggregator 336 may track all of the data source and other resources (e.g., applications, local or cloud-based services) that may be provided to the user via a workspace.

Local management agent 332 may utilize a resource manager module 337 that is configured to manage access to data, network configuration, such as for VPNs and network access, identity information, access control, and resource provisioning services. Security module 338 may be configured to provide various security services. BIOS interface 339 may provide a secure BIOS interface used for accessing and managing credentials in secure object storage. A BIOS analytics module 340 may be configured to perform forensic services for BIOS telemetry and health assessments. Persistence module 346 may be configured to support persistence of applications entitled at a POS or assigned by administrators and supported with required license tracking. Workspace attestation module 333 may provide a platform centric service layer on top of a container engine provided by local management agent 332 and may be used to measure and attest workspaces 331A-N in any suitable manner defined or orchestrated by condition control 305.

As part of secure platform 345, native management module 347 may be configured to enable out-of-band management interface with workspace orchestration service 206, where this OOB interface operates independent form the OS of IHS 300B. In some embodiments, the OOB management interface supported by native management module 347 may be utilized by the device configuration services 316 of the workspace orchestration service to access the secure platform services 345 of IHS 300B.

Digital device ID module 348 may provide a unique, unspoofable, cryptographically bound identifier. In embodiments supporting a secure platform 345, secure embedded controller 341 may be a hardened hardware module that may include a root of trust module 342 configured as a trusted data store and, in some cases for cryptographic processing, that may be trusted within a cryptographic system. A device attestation service 343 may be configured to perform device assurance and trust services (e.g., secure BIOS and secure boot, etc.). A secure object store 344 may be provided that is configured to lock and access keys, hashes, and/or other secrets in an EC and/or trusted platform module (TPM).

In some scenarios, IHS 100 may be provisioned by a manufacturer that also controls manufacturer integration components 317, workspace attestation module 333 may operate in conjunction with secure object store 342, authenticated BIOS module 339, and/or digital device identity module 348, etc., to further secure and/or control productivity features available in any of workspaces 331A-N based upon hardware devices and settings unique to that IHS and/or designed specifically by that manufacturer.

To further illustrate how the systems and methods described herein operate to modernize workspace and hardware lifecycle management in an enterprise productivity ecosystem, three non-limiting use-cases or examples are discussed in turn below.

Use-Case A

In use-case A, a given user may request access to a protected data source on the enterprise's premise using a corporate-owned and imaged notebook, such configured as described with regard to IHS 100 of FIG. 1 and client IHS 300B of FIG. 3B.

In response to the request, a local management agent 332 operating on the user's notebook retrieves information describing the current context and calculates security and productivity targets based on the determined context. In this use-case, the local management agent may have been installed by IT, and it may be running in the background as a service. The confidential data may be associated with the local management agent on the local machine, based on file classification (e.g., file metadata/type/properties/permissions, folder location, encrypted region, etc.). Moreover, the local management agent may continuously collect current context information and send it to the orchestration service for use in scoring the risk and productivity of the workspace (this may also be done at the time of the user's access request or indication of intent).

When the user selects the confidential data, such as via a selection via the OS of the notebook, the local management agent notifies the workspace orchestration service of the request and for a workspace definition for a workspace by which the user may be provided access to the confidential data.

In this example, the workspace orchestration service may score an overall security risk to have a value of "2," using a weighed, machine learning, or artificial intelligence algorithm, based upon the following context information or inputs, each of which is also given as a risk metric based upon a selected policy: locale: 1 (safe locale); user persona: 1 (known high-confidence in a reasonably sophisticated user classification—a user whom historically does not click on phishing emails); network risk: 1 (low risk because of on premise, wired connection detected); device risk: 1 (high level of control because of corporate owned/managed platform, known versions, security features enabled, etc.); regulatory: 1 (based on user, data, location combinations—e.g., No restrictions with respect to General Data Protection Regulation or "GDPR," Health Insurance Portability and Accountability Act "HIPAA," Payment Card Industry "PCI," technology export, etc.); and data type: 8 (a confidential datafile is being requested).

The workspace orchestration service may also calculate a productivity score to have a value of "9," using a weighed, machine learning, or artificial intelligence algorithm, based upon the following context information or inputs, each of which is also given as a resource metric based upon a selected policy: locale: 10 (office); user persona: 9 (a "skilled" classification based upon advanced compute tasks, proficiency, and/or speed); network speed/latency: 10 (fast, wired, Gigabit Ethernet, or direct to internal network); device performance: 8 (fast, expensive CPU, memory, graphics, but storage only needs—e.g., <10 GB); and data type: 10 (the local, confidential file is easy to read/write with low latency and high performance on local storage).

Second, based upon the security score and/or context information, the workspace orchestration service builds a workspace definition file having any suitable structure with workspace definition attributes in a machine-readable format (e.g., JSON name-value, XML structured, etc.). In this example, the security target may be deemed to have a value of "1" based upon a combination of attributes values representing loads, needs, or demands on security controls and containment features that may include: threat monitoring: 1 (low demand); threat detection: 1 (low demand); threat analytics: 1 (low demand); threat response: 1 (low demand); storage confidentiality: 2 (low); storage integrity: 2 (low); network confidentiality: 1 (low); network integrity: 1 (low); memory confidentiality: 1 (low); memory integrity: 1 (low); display confidentiality: 1 (low); display integrity: 1 (low); user authentication: 1 (low, basic password is fine, non-multifactor authentication or "MFA," no session expiration); IT administrator scope: 1 (administrator manages remotely but does not need heavy remediation software; and regulatory compliance: 1 (no GDPR, No HIPAA, no PCI, no tech export restriction, etc.).

Based upon the productivity target and/or context information, a productivity target for the workspace definition may be deemed to have a value of "9" (defining a high-quality, responsive user experience) based upon a combination of attribute values representing productivity requirements as follows: local storage: 7 (partial hard drive control, some storage reserved for IT load); CPU access: 10 (unlimited); local graphics: 10 (unlimited); and application stack: 10 (can use applications, install applications that the user needs, give them administrator rights, etc.).

Third, after the workspace definition is complete, the workspace orchestration service and the local management agent may assemble the workspace and instantiate it for the user. For example, the local management agent may receive definition files (e.g., JSON, XML, etc.) from the orchestration service, and it may parse the file to implement security risk controls such as: threat monitoring: 1 (local management agent does not install threat, detection, and response or "TDR" software); threat detection: 1 (local management agent does not install TDR software); threat analytics: 1 (orchestration does not need to gather detailed telemetry from the system, OS will not be enrolled in logging); threat response: 1 (local management agent does not install security threat response agent); storage confidentiality: 2 (local management agent deploys a local file-system encryption product that the user can optionally enable on specific files as needed with right-click context menus); storage integrity: 2; network confidentiality: 1 (local management agent confirms basic firewall configuration is correct—e.g., IT GPO-controlled); network integrity: 1; memory confidentiality: 1 (local management agent confirms configuration—e.g., No SGX, TXT, or container/sandbox software deployed); memory integrity: 1; display confidentiality: 1 (local management agent confirms graphics drivers installed, privacy screen and camera optionally managed by user); display integrity: 1; user authentication: 1 (local agent confirms basic GPO password rules are configured, and met by user—e.g., number of characters, no session expiration, etc.); IT administrator scope: 1 (local agent runs with system privilege, confirms IT admin accounts are listed in local admin user group—e.g., per GPO); and regulatory compliance: 1 (local agent does not install any compliance assistance software).

After confirming the configuration, the workspace orchestration service and the local management agent may give the user access to the requested local confidential file, and the user may begin working in a newly created workspace.

Use-Case B

In use-case B, a user may request access to a confidential datafile while at a coffee shop using an open public network and an IT-managed/owned PC, such configured as described with regard to IHS 100 of FIG. 1 and client IHS 300B of FIG. 3B.

First, a local management agent (332) executed by a client IHS (300B) retrieves the requested context and calculates security and productivity scores based on context. In this use-case, the local management agent may have been installed by IT, and it may be running in the background as a service. The confidential data may kept on a shared IT-managed network resource on-premises (e.g., back in a main corporate office), and the local management agent may be responsible for monitoring when this data path is requested by the user (e.g., the user hits a specific URL, IP, etc.). Moreover, the local management agent may continuously collect all current context and send it to the workspace orchestration service to assist in scoring processes later (this may also be done at the time of the user's access request or indication of intent, rather than a continuous collection).

When the user selects the desired confidential datafile, the client IHS (300B)'s OS calls the local management agent associated with the path to the confidential datafile and calls back to a remote workspace orchestration service (206) to request a workspace definition.

In this example, the workspace orchestration service may score an overall security risk to have a value of "4," using a weighed, machine learning, or artificial intelligence algorithm, based upon the following context information or inputs, each of which is also given as a risk metric based upon a selected policy: locale: 5 (public, safe country); user persona: 5 (new user, classification data does not exist yet); network risk: 5 (medium, public but common location, wireless connection detected); device risk: 1 (high level of control, corporate owned/managed platform, known versions, security features enabled, etc.); and regulatory: 1 (based on user, data, location combinations—e.g., no restrictions with respect to General Data Protection Regulation or "GDPR," Health Insurance Portability and Accountability Act "HIPAA," Payment Card Industry "PCI," technology export, etc.).

The workspace orchestration service may also calculate a productivity score to have a value of "5," using a weighed, machine learning, or artificial intelligence algorithm, based upon context information or inputs, each of which is also given as a resource metric based upon a selected policy. For instance, security contexts inputs may include: locale: 6 (remote location but in USA major city, in a public area, non-employees are within visual/audio range of device); user persona: 5 (unknown confidence "null" classification, uses default onboarding assumptions); network speed/latency: 4 (medium, wireless but AC on shared network); and device performance: 8 (fast, expensive CPU, memory, graphics, but storage only needs ~<10 GB).

Second, based upon the security score and/or context information, the workspace orchestration service builds a workspace definition file having any suitable structure with workspace definition attributes in a machine-readable format (e.g., JSON name-value, XML structured, etc.). In this example, a security target may be deemed to have a value of "4" based upon a combination of attributes values representing loads, needs, or demands on security controls and containment features as follows: threat monitoring: 4 (medium demand); threat detection: 4 (medium demand); threat analytics: 4 (medium demand); threat response: 4 (medium demand); storage confidentiality: 4 (medium); storage integrity: 9 (high); network confidentiality: 5 (medium); network integrity: 2 (low); memory confidentiality: 4 (medium); memory integrity: 8 (high); display confidentiality: 7 (medium/high—worried about "shoulder surfers" reading data from an adjacent seat or table nearby, public location) display integrity: 2 (low); user authentication: 4 (medium, two-factor authentication using a hardware token, session expiration upon sleep, screen lock, or logout); IT administration scope: 3 (administrator can monitor, manage, and remediate remotely if the user calls them for help with IT issues); and regulatory compliance: 1 (no GDPR, No HIPAA, no PCI, no tech export restriction, etc.).

Based upon the productivity target and/or context information, a productivity target for the workspace definition may be deemed to have a value of "7" (defining a high-quality, responsive user experience) based upon a combination of attribute values representing productivity requirements as follows: local storage: 7 (partial hard drive control, some storage reserved for IT load); CPU access: 10 (unlimited); local graphics: 10 (unlimited); and application stack: 7 (can use applications, can install some IT-approved applications that the user needs, but no administrator rights, because the user cannot be trusted to install only valid/safe productivity software, but can install pre-approved IT applications as needed).

Third, after the workspace definition is complete, the workspace orchestration service and the local management agent may assemble the workspace and instantiate it for the user. For example, the local management agent may receive definition files (e.g., JSON, XML, etc.) from the orchestration service, and it may parse the file to implement security risk controls such as: threat monitoring: 5 (local management agent installs or confirms prior installation/configuration of TDR software); threat detection: 5 (local management agent installs or confirms prior installation/configuration of TDR software); threat analytics: 5 (orchestration confirms telemetry is accessible, OS will be enrolled in logging if not already enrolled); threat response: 2 (local management agent downloads but does not run remote incident response application—preparation in case incident is detected); storage confidentiality: 5 (local management agent deploys a local container technology, such as sandbox, with restricted "save" permissions such that the confidential files will not be allowed to save locally on the PC, but can be accessed as long as the session is active in memory); storage integrity: 5; network confidentiality: 5 (local management agent steps up firewall protections, disabling all unnecessary ports, and establishes a VPN back to the corporate office for protecting traffic to the local sandbox); network integrity: 5; memory confidentiality: 5 (local management agent configures sandbox container to isolate application and data from other applications/threats that may infiltrate the host OS); memory integrity: 5; display confidentiality: 7 (local management agent confirms graphics drivers installed, enforces privacy screen and uses camera to detect specific onlooker threats); display integrity: 7; user authentication: 4 (local agent confirms basic GPO password rules are configured, and met by user—e.g., number of characters, no session expiration, etc., but also adds in a requirement for hardware token to log in and again to establish network); IT administrator scope: 4 (local agent runs with administrator and remote access privilege, confirms IT admin accounts are listed in local admin user group—e.g., per GPO); and regulatory compliance: 4 (local agent installs state specific rule enforcement or monitoring software).

After confirming the configuration, the workspace orchestration service and the local management agent may give the user access to the requested local confidential file, and the user may begin working in a newly created workspace.

Use-Case C

In use-case C, a user may request access to a confidential datafile in a web hosted remote portal using a browser from Kazakhstan, while at an internet café with a borrowed/rented PC, such configured as described with regard to IHS 100 of FIG. 1 and client IHS 300B of FIG. 3B, on an open WiFi network.

First, a remote workspace orchestration service (332) intercepts the access request and evaluates the browser and user context, and calculates security and productivity scores. In this use-case, there is no local management agent; all that is known is the browser and any telemetry returned or garnered through the HTTP/S session. Assume, for sake of this example, that the confidential data may kept on a shared IT-managed network resource on-premises (e.g., back in a main corporate office) and that the datafile will remain there with only remote rendering/access privileges. Web-based context may be gathered through the browser session or supplied by the user. Moreover, user context may also be collected for the workspace orchestration service through alternate side-channels (e.g., travel calendar information, recent user billing activity on corporate credit card, phone call logs, and/or location data).

When the user selects the desired confidential datafile from the web browser, the back-end web server infrastructure calls back to the workspace orchestration service to request a workspace definition.

In this example, the workspace orchestration service may score an overall security risk to have a value of "9," using a weighed, machine learning, or artificial intelligence algorithm, based upon the following context information or inputs, each of which is also scored as a risk metric based upon a selected policy: locale: 9 (Kazakhstan); user persona: 1 (user was expected to be there, the timing seems right based upon past logins, and he has a biometric watch communicator proving he is alive, himself, and located where he says he is—so that IT can always trust him); network risk: 9 (high, public and in a very obscure place); device risk: 9 (zero trust); and regulatory: 8 (based on user, data, location combinations).

The workspace orchestration service may also calculate a productivity score to have a value of "5," using a weighed, machine learning, or artificial intelligence algorithm, based upon the following context information or inputs, each of which is also given as a resource metric based upon a selected policy: locale: 3 (internet café device without great performance); user persona: 9 (known high-confidence and "skilled" classification—advanced compute tasks, proficiency, and speed); network speed/latency: 3 (low quality—Wireless G from a long way away); and device performance: 3 (have to be able to tolerably browse web pages but based on what the service believes the capabilities will be, the service should build simple ones).

Second, based upon the security score and/or context information, the workspace orchestration service builds a workspace definition file having any suitable structure with workspace definition attributes in a machine-readable format (e.g., JSON name-value, XML structured, etc.). In this example, a security target may be deemed to have a value of "9" based upon a combination of attributes values representing loads, needs, or demands on security controls and containment features as follows: threat monitoring: 10 (high demand, to be handled on the server side); threat detection: 10 (high demand, to be handled on the server side); threat analytics: 10 (high demand, to be handled on the server side); threat response: 10 (high demand, to be handled on the server side); storage confidentiality: 10 (high demand, to be handled on the server side); storage integrity: 8; network confidentiality: 10 (high demand, to be handled on the server side); network integrity: 9; memory confidentiality: 10 (high demand, to be handled on the server side); memory integrity: 9; display confidentiality: 10 (high, "shoulder surfers" may read datafile from an adjacent seat or table nearby in a public location); display integrity: 9; user authentication: 10 (high, three-factor authentication using login, hardware token, and biometric satellite watch—session expiration and refreshes every 30 seconds); IT administrator scope: 8 (administrator may monitor, manage, and remediate remotely if the user calls them for help or anything unexpected happens); and regulatory compliance: 10 (all network traffic is securely monitored as will the data presented).

Based upon the productivity target and/or context information, a productivity target for the workspace definition may be deemed to have a value of "3" (defining a usable secure user experience primarily built for consumption and not productivity) based upon a combination of attribute values representing productivity requirements as follows: local storage: 1 (cache only); CPU access: 3 (build for limited expectations); local graphics: 3 (build for limited expectations); and application stack: 1 (web browser experience on a kiosk mode device, limited data entry capability, limited read access to need-to-know only information through VDI rendered kiosk).

Third, after the workspace definition is complete, the workspace orchestration service and remote cloud web portal (e.g., session the user logged into through the browser) may assemble the workspace and instantiate it for the user in the browser. For example, the web portal may receive definition files (e.g., JSON, XML, etc.) from the orchestration service, and it may parse the file to implement security risk controls such as: threat monitoring: 9 (data center based management agent installs or confirms prior installation/configuration of TDR software); threat detection: 9 (data center based management agent installs or confirms prior installation/configuration of TDR software); threat analytics: 9 (orchestration confirms telemetry is accessible, server hosting web server may be enrolled in logging if not already enrolled—user behavioral telemetry from side channels may also be continuously monitored for suspicious/anomalous activity); threat response: 10 (data center-based management agent sets up watchdog timer to kill session automatically without periodic check-ins from orchestration, user telemetry, and web browser); storage confidentiality: 9 (data center-based management agent builds a progressive web application that may be used to display the data through a secure TLS link—the data will be rendered but only the as-needed portions of visualization presented to the user, and nothing can be saved); storage integrity: 10; network confidentiality: 9 (route traffic through best effort to secure locations—do not allow anything except bitmap renderings through the enforceable network); network integrity: 4; memory confidentiality: 9 (web page viewer only-no data leaves the data center, no confidential input is taken from the rented PC, no keyboard input is allowed, and all input may be captured from randomized virtual keyboard using mouse click coordinates); memory integrity: 8; display confidentiality: 8 (best effort to ensure confidentiality—prompt user at least—adjustable font sizes, but defaults to small fonts, obfuscated text, etc.); display integrity: 2; user authentication: 9 (local agent confirms basic password rules are configured, and met by user—e.g., number of characters, no session expiration, etc., but also adds in a requirement for hardware token and biometric, satellite watch to log in and again to establish network, requiring frequent reconfirmation from user); IT administrator scope: 7 (data center-based remote environment); and regulatory compliance: 8 (local agent does not exist but data center-based agent monitors/blocks data not appropriate).

After confirming the configuration, the workspace orchestration service and the local management agent may give the user access to the requested rendered data, and the user may begin working in a newly created workspace.

The dissemination of collaboration platforms for multi-participant sessions (e.g., remote collaboration sessions, tele-conferences, remote meeting rooms, etc.) has created an industry-wide need for workspaces that can securely handle multi-user and/or multi-author documents and/or sessions. For example, a policy may require that certain classifications or types of protected documents, resources, or data have all authors or interested parties (or a minimum number of them) present at a collaboration session when the document, resource, or data is created, deployed, and/or modified. In some cases, the document, resource, or data may need protection against any and all access unless all authors or interested parties are present in the same session. Additionally, or alternatively, certain documents, resources, or data may be configured to store a certificate intended to prove that all authors or interested parties participated in the creation, deployment, or modification of the document, resource, or data (e.g., confidential or private documents, legal documents, contracts, etc.).

To address these, and various other issues, systems and methods described herein may securely deploy a collective workspace across multiple local management agents. In various embodiments, these systems and methods may prevent access to a protected document, resource, or data, until all (or a selected number of) authors, users, or interested parties are present in the same collaborative workspace session. For example, a group of two or more users participating in a collaborative workspace session may be prevented from accessing video conference capabilities or applications until a quorum is present (a selected number of participants fewer than all identified or expected participants) or a plenary session is reached (all identified or expected participants are present). Generally speaking, in order to implement these systems and methods, collaborative workspace session users or participants do not need to a have trust relationship amongst themselves (or through any other trust entity).

Figure 4:
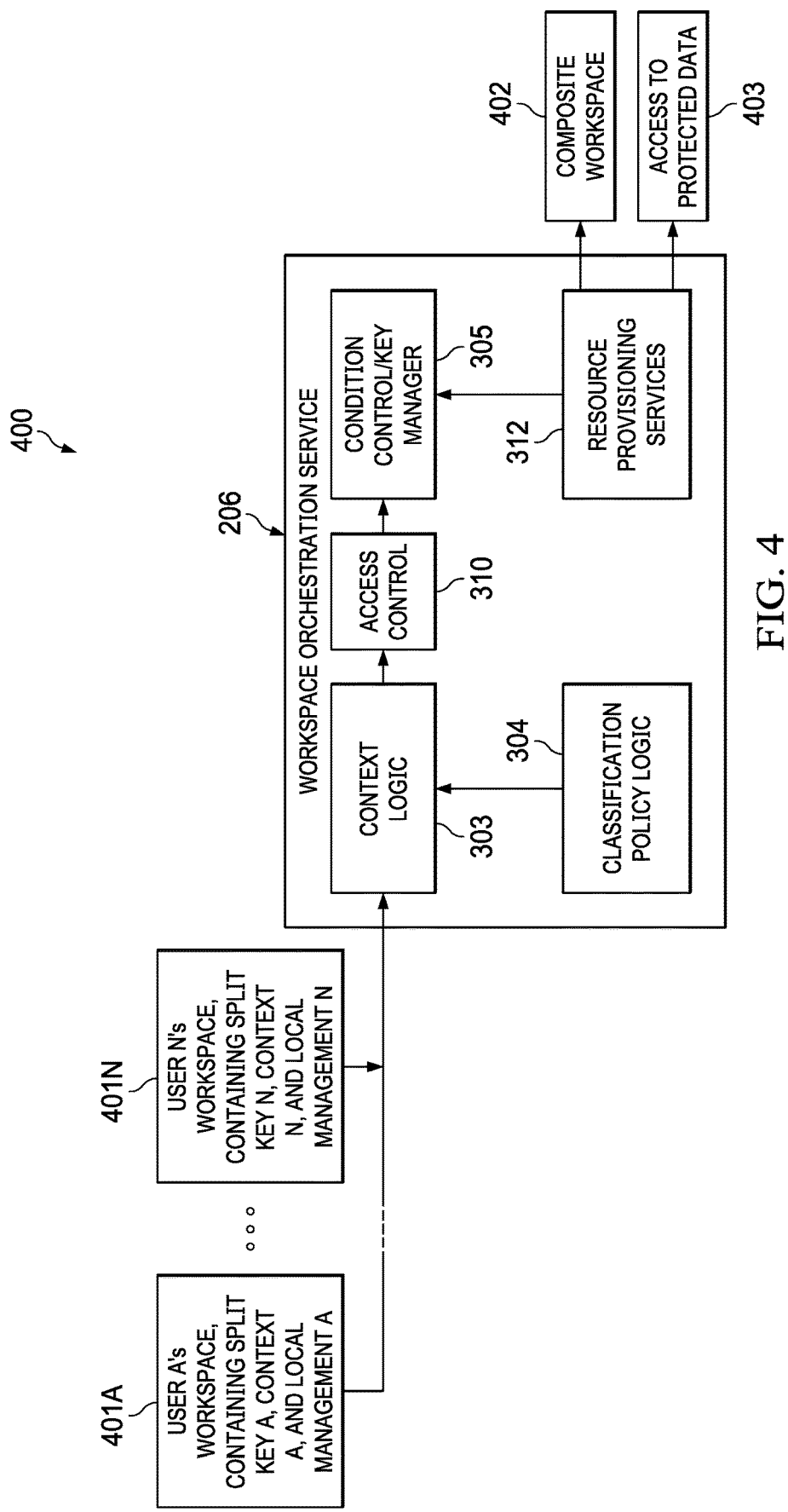
FIG. 4 is a diagram of an example of a method for securely deploying a collective workspace across multiple local management agents, according to various embodiments.

FIG. 4 is a diagram of an example of method 400 for securely deploying a collective workspace across multiple local management agents. In various embodiments, method 400 may be performed by different instances of local management agents 332 executed by different IHSs 100 under control of different users 201 and in cooperation with workspace orchestration service 206. At block 401A, a first user (at least one participant of a collaborative workspace) transmits first data, device, and/or user context information and a first split key to workspace orchestration service 206. At block 401N, an Nth user or participant transmits Nth data, device, and/or user context information, as well as an Nth split key, to workspace orchestration service 206.

As used herein, the term "split key" generally refers to any cryptographic key that is divided into two or more values (or "split keys") that individually cannot be used to deduce the entire key. A cryptographic key may be a string of data that is usable to securely authenticate, authorize, and/or encrypt data.

In some cases, blocks 401A-N may take place at approximately the same time.

Additionally, or alternatively, blocks 401A-N may happen in response to: a calendar event (e.g., a scheduled meeting), co-presence of users A-N at the same geolocation or network, the users' login to workspace orchestration service 206 (or another remote service(s)), etc.

Context information received from users A-N may be used by context logic 303 to determine which of a plurality of collaborative workspace policies handled by block 304 may be applicable to that context. Examples of context information include, but are not limited to: IP address, geolocation, access point information, user authentication, device ID key derivation, collaboration meeting information (e.g., from calendaring application), etc. Each of a plurality of different collaborative workspace policies may be associated with different context information, and the creation or retrieval of a corresponding collaborative workspace definition may be predicated upon the context information from one or more users A-N (or all users) matching a respective policy.

Access control 310 may receive split keys A-N from the various participants, and it may be configured to provide collaborative workspace access to authorized users following the applicable policy. Particularly, access control 310 may forward the split keys to condition control/key manager block 305, which authenticates all split keys, for example, sequentially or at once in combination with each other. Once all participants (or a minimum quorum of fewer than all participants) have been properly authenticated, resource provisioning services 312 may create and/or retrieve composite or collaboration workspace definition 402, and it may selectively provide access to protected data 403 matching the collaborative workspace policy to users A-N.

In various implementations, a collaborative workspace instantiated based upon collaboration workspace definition 402 may include a productivity target and a security target, and productivity and security scores may be evaluated similarly as with individual workspaces.

In some cases, resource provisioning services 312 may transmit a first portion of a collaborative workspace definition to the first local management agent 332 (e.g., user A's) and a second portion of the collaborative workspace definition to a second local management agent (e.g., user N's). Each of the first and second local management agents may be configured to instantiate at least one aspect of the collaborative workspace based upon their respective portions of the collaborative workspace definition. For example, a first portion of a collaborative workspace definition transmitted to the first local management agent 332 (e.g., user A's) may provide certain types of access (e.g., editing) to selected documents, whereas a second portion of the collaborative workspace definition transmitted to the second local management agent 332 (e.g., user N's) may provide other types of access (e.g., viewing-only) to the same selected documents (or other documents).

Additionally, or alternatively, varying degrees of access granularity may be applied, as indicated in the applicable collaborative workspace policy. For example, in a collaboration session where less than plenary attendance is reached, only parts of a document or repository may be accessible, or parts thereof may be redacted, until all (or more) participants are present. In some cases, fewer participants present produce more redactions of access, more participants present produce fewer redactions or more access, and all participants present (plenary attendance) produce no redactions and full access.

As such, systems and methods described herein may utilize the context of two or more users to provide access to a document, data, or resource. These systems and methods may include the use of split keys as a form of context for access control, which may also include each user's location, etc.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
receive, at a workspace orchestration service from a first local management agent, first context information and a first split key;
receive, at the workspace orchestration service from a second local management agent, second context information and a second split key;
determining, by the workspace orchestration service, that the first and second context information match a first collaborative workspace policy of a plurality of different collaborative workspace policies;
in response to the determination that the first and second context information matches the first collaborative workspace policy, authenticate the first and second split keys;
in response to the authentication of the first and second split keys, retrieve or create a collaborative workspace definition based upon the first collaborative workspace policy; and
transmit the collaborative workspace definition to the first and second local management agents.

2. The client IHS of claim 1, wherein the first context information comprises at least one of: an identification of a locale of the first local management agent, an identification of a user of the first local management agent, an identification of a network of the first local management agent, an identification of hardware of the first local management agent, an identification of a requested datafile, or an identification of a storage system of the requested datafile; and wherein the second context information comprises at least one of: an identification of a locale of the second local management agent, an identification of a user of the second local management agent, an identification of a network of the second local management agent, an identification of hardware of the second local management agent, the identification of the requested datafile, or the identification of the storage system of the requested datafile.

3. The IHS of claim 1, wherein to transmit the collaborative workspace definition to the first and second local management agents, the program instructions, upon execution, further cause the IHS to:
transmit a first portion of the collaborative workspace definition to the first local management agent; and
transmit a second portion of the collaborative workspace definition to the second local management agent.

4. The IHS of claim 1, wherein each of the first and second local management agents is configured to instantiate at least one aspect of a collaborative workspace based upon the collaborative workspace definition.

5. The client IHS of claim 1, wherein the collaborative workspace definition comprises at least one of: a threat monitoring level, a threat detection level, a threat analytics level, a threat response level, a storage confidentiality level, a network confidentiality level, a memory confidentiality level, a display confidentiality level, a user authentication level, an Information Technology (IT) administration level, a regulatory compliance level, a local storage control level, a Central Processing Unit (CPU) access level, a graphics access level, an application usage level, or an application installation level.

6. The IHS of claim 1, wherein the program instructions, upon execution, further cause the IHS to, in response to the authentication, grant or remove access to protected data matching the collaborative workspace policy.

7. The IHS of claim 6, wherein the program instructions, upon execution, further cause the IHS to grant or remove access to the protected data in response to an indication that the first and second local management agents meet a quorum or plenary session indicated in the collaborative workspace policy.

8. The IHS of claim 1, wherein the program instructions, upon execution, further cause the IHS to, in response to the authentication, deny access to, or redact, a portion of protected data matching the collaborative workspace policy.

9. The IHS of claim 8, wherein the program instructions, upon execution, further cause the IHS to:
receive, at the workspace orchestration service from a third local management agent, third context information and a third split key;
determine, by the workspace orchestration service, that the third context information matches the first collaborative workspace policy;
in response to the determination that the third context information matches the first collaborative workspace policy, authenticate the third split key;
in response to the authentication, transmit the collaborative workspace definition to the third local management agent; and
grant or remove access to the portion of the protected data.

* * * * *